United States Patent
Greiner et al.

(10) Patent No.: US 6,242,699 B1
(45) Date of Patent: Jun. 5, 2001

(54) APPARATUS FOR PROCESSING THE END OF A COAXIAL HIGH FREQUENCY CABLE

(75) Inventors: Martin Greiner, Hemmingen; Detlef Bergmann, Garbsen; Gunter Ahrens, Langenhagen; Reimer Nagel, Hannover, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/527,675

(22) Filed: Mar. 17, 2000

(30) Foreign Application Priority Data

Mar. 18, 1999 (DE) .............................. 199 11 903

(51) Int. Cl.$^7$ ...................................... B21F 13/00
(52) U.S. Cl. .......................... 174/75 C; 30/90.2; 30/91.2
(58) Field of Search ..................... 174/75 C, 78; 30/90.1, 90.2, 90.3, 90.4, 91.1, 91.2, 90.6, 90.7, 90.8, 90.9; 81/9.4, 9.43

(56) References Cited

U.S. PATENT DOCUMENTS 4,731,928 * 3/1988 Jackson .................................. 30/90.2

* cited by examiner

Primary Examiner—Dean A. Reichard
Assistant Examiner—Chau N. Nguyen
(74) Attorney, Agent, or Firm—Sughrue, Mion, Zinn, Macpeak & Seas, PLLC

(57) ABSTRACT

An apparatus for processing the ends of a coaxial high frequency cable, which has a tubular inner conductor, a dielectric enclosing the same, a tubular outer conductor arranged over the same concentrically to the inner conductor, and a sheath of insulation material enclosing the outer conductor. The apparatus includes a pot-like device (1) with a cylindrical hollow space (2) the diameter (D1) of which at the input area corresponds to the diameter of the high-frequency cable including the sheath. Within the device (1), at the end of the input area, at least one sheath knife (5) for cutting the sheath is arranged, the blade of which projects into the hollow space (2). The diameter (D2) of the hollow space (2) behind the input area corresponds to the outside diameter of the outer conductor of the high frequency cable. At the closed end of the device (1), at least one knife (6, 7) is arranged whose blade for cutting the outer conductor, the dielectric, and the inner conductor of the high frequency cable projects into the hollow space (2). In the center within the hollow space (2), extending along its axial direction, a cylindrical pin (8) whose outside diameter corresponds to the inside diameter of the hollow inner conductor of the high frequency cable is rotatably supported.

7 Claims, 2 Drawing Sheets

APPARATUS FOR PROCESSING THE END OF A COAXIAL HIGH FREQUENCY CABLE

BACKGROUND OF THE INVENTION

The invention relates to an apparatus for processing the end of a coaxial high frequency cable, which has a tubular inner conductor, a dielectric enclosing the same, a tubular outer conductor arranged over the same concentrically to the inner conductor, and a sheath of insulation material enclosing the outer conductor.

Such an apparatus is advantageously used at the installation site where coaxial high frequency cables (HF cables) are to be interconnected or connected to devices such as senders and receivers. For this connection, the current state of the art uses connectors with an outer sleeve and an inner pin, which after installation have electrically conductive contact with the outer conductor and the inner conductor of the HF cable. For this purpose, the end of the HF cable must be formed in such a way that the required electrical contact can be made. This is not a problem for the inner conductor of the HF cable. Its outer conductor, however, must first be laid bare. For this purpose, the sheath enclosing the outer conductor is manually cut with a knife and removed to a predefined length. During this action, the outer conductor can easily be damaged by the knife. Furthermore, it is often difficult with this working method to meet the length for which the sheath is to be removed.

SUMMARY OF THE INVENTION

The object of the invention is to define an apparatus for processing the end of a coaxial HF cable, which is simple to handle and with which the sheath is dimensionally exactly removed from the outer conductor to the predefined length.

This object is attained in an apparatus of the initially described type by using a pot-like device with a cylindrical hollow space, in which:

the diameter of the hollow space of an input area located at the open end of the device corresponds to the diameter of the HF cable including the sheath, at the end of the input area located within the device, at least one sheath knife for cutting the sheath is arranged, the blade of which projects into the hollow space, the diameter of the hollow space behind the input area corresponds to the outside diameter of the outer conductor of the HF cable, at the closed end of the device at least one knife is arranged whose blade for cutting the outer conductor, the dielectric, and the inner conductor of the HF cable projects into the hollow space, and in the center, within the hollow space, extending in its axial direction, a cylindrical pin is arranged, the outside diameter of which corresponds to the inside diameter of the hollow inner conductor of the HF cable.

For the dimensionally accurate removal of the end of an HF cable, this device is placed on the end face of said cable. The central pin serves as a guide. As the apparatus is rotated about its axis and axial pressure is simultaneously applied in the direction of the HF cable, the sheath knife helically cuts open the sheath. The chip, thus created, is lifted by the outer conductor of the HF cable and removed through an opening of the device in the area of the sheath knife. The device, thereby, continues to be pushed further onto the HF cable until said cable pushes against the floor of the closed end of the device. The knife located at that point then performs a cut that flatly severs in one plane the end of the HF cable.

At the same time, the cut of the sheath knife changes to a circular cut. The sheath is now removed from the outer conductor of the HF cable to a length predefined by the apparatus. The end of the HF cable is ready for installation of a connector.

BRIEF DESCRIPTION OF THE DRAWING

An exemplary embodiment of the subject of the invention is depicted in the drawings, wherein.

DETAILED DESCRIPTION OF THE INVENTION

Figure 1:
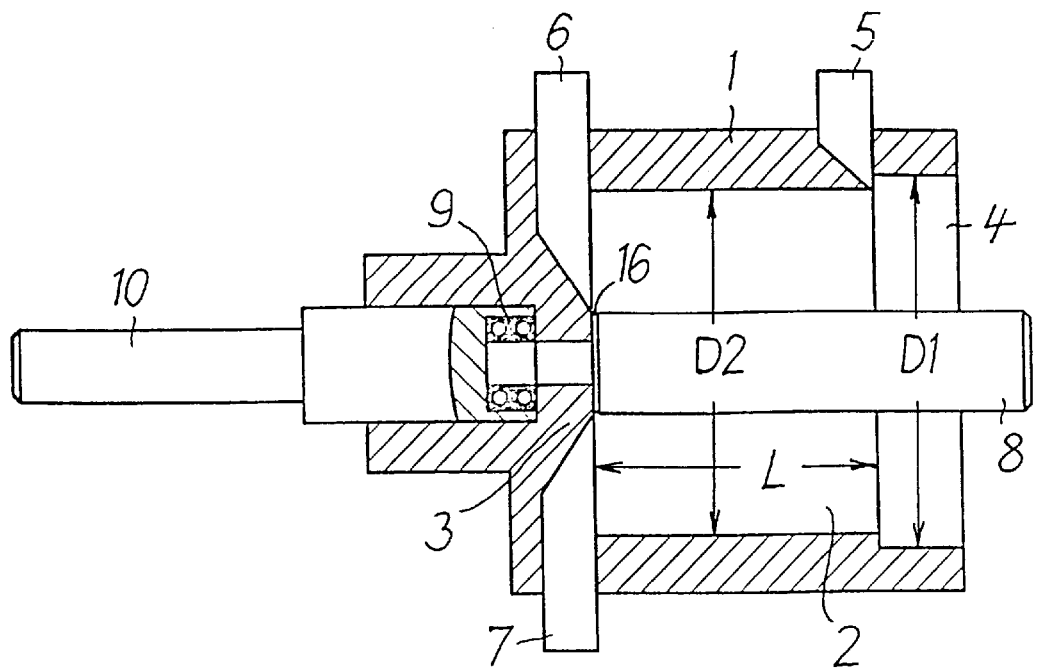
FIG. 1 shows a cross section of an apparatus according to the invention.
Figure 2:
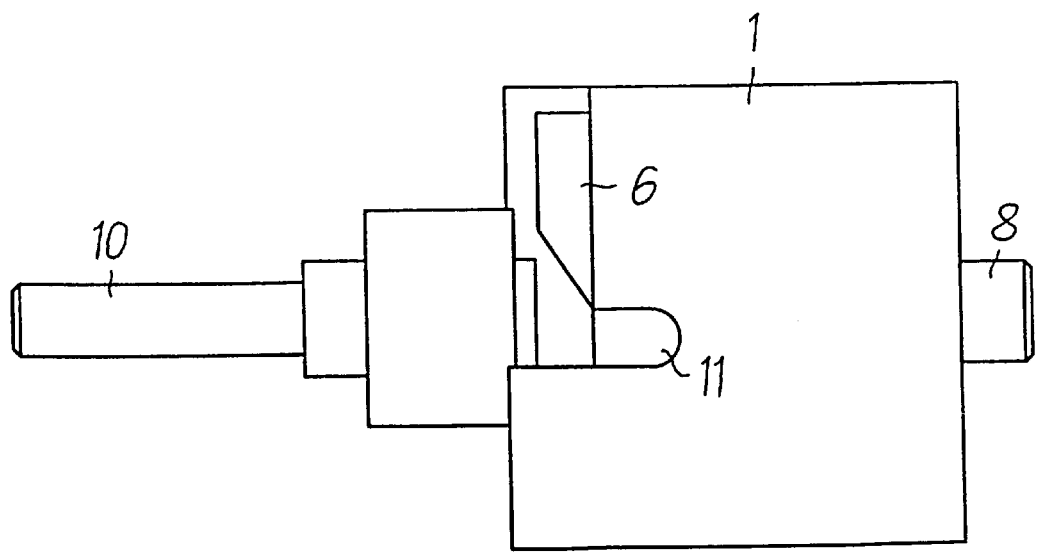
FIG. 2 shows a side view of the apparatus.

The drawings depict the apparatus only schematically. Details that are not required to understand the invention have been omitted. This applies, for example, to the attachment of the knives, which are preferably mounted so that they can easily be exchanged.

The apparatus for taking off the end of an HF cable comprises a pot-like device 1 with a cylindrical hollow space 2, a floor 3, and an opening 4. A sheath knife 5 and two knives 6 and 7 projecting with their blades into the hollow space 2 are attached to device 1, for example, by means of screws. Within device 1 a pin 8 is attached in the center, which extends in axial direction of device 1 and, in a preferred embodiment, projects beyond it. Pin 8 in the area of floor 3 of device 1 at a bearing location 9 can furthermore be supported so as to be rotatable about its axis. On the side of device 1 facing away from opening 4, a bolt 10 can furthermore be centrally mounted on said device protruding outwardly in axial direction, by means of which device 1 may be inserted, for example, into a drill.

In the area of floor 3 of device 1, at least one of knives 6 or 7 is mounted. Preferably, both knives 6 and 7 are used, diametrically opposite each other. In the area of knives 6 and 7, the wall of device 1 is perforated at a point 11 so that the hollow space 2 is visible.

Figure 3:
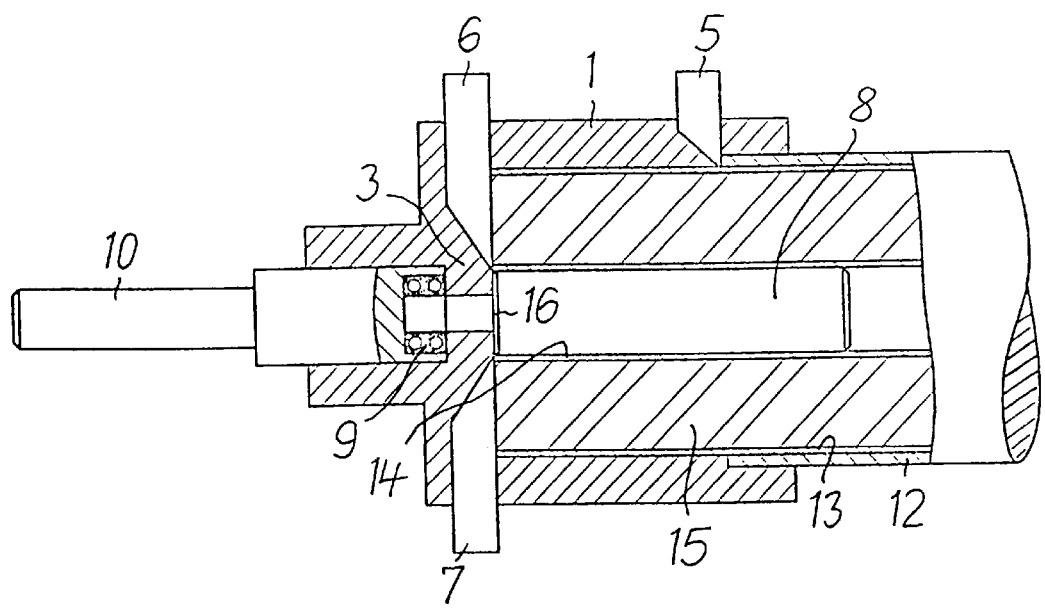
FIG. 3 shows the apparatus according to FIG. 1 on a removed end of an HF cable.

The dimensions of device 1 correspond to the dimensions of an HF cable, the ends of which are to be dimensionally accurately processed. Hollow space 2 at opening 4 has an input area the diameter D1 of which corresponds to the outside diameter of the HF cable to be processed, which is shown in FIG. 3 including its sheath 12. The axial length of the input area is short compared to the axial length of device 1. At the interior end of the input area, sheath knife 5 with its blade projects far enough into hollow space 2 so that it just cuts sheath 12 of the HF cable without, however, touching the outer conductor 13 of said cable.

The hollow space 2 adjacent to the input area, which is axially substantially longer than the latter, has a diameter D2, which corresponds to the outside diameter of outer conductor 13 of the HF cable. This area has a length L, which corresponds to the length of a connector to be mounted to the HF cable, along which a bare outer conductor 13, from which sheath 12 has been removed, is required.

The apparatus according to the invention is handled, for example, as follows:

Device 1 is placed onto the end of an HF cable and pressed against said cable in axial direction. Pin 8 penetrates the inner conductor 14 of the HF cable as a guide. Sheath 4 fits against the wall of device 1 along its input area. As soon as the HF cable or its sheath 12 reaches sheath knife 5, device 1 is rotated. With simultaneous pressure on the device in axial direction, sheath 12 is peeled off by sheath knife 5. Device 1 is further pushed onto the HF cable until the end face of the cable is within reach of knives 6 and 7. Said knives sever the outer conductor 13, the dielectric 15, and the inner conductor 14 of the HF cable and produce a flat end face on said cable. This can be checked through the opening at point 11. So that the inner conductor 14 can be completely severed, it is advantageous to provide pin 8 with a circumferential groove 16 in the area of knives 6 and 7.

Handling of device 1 is facilitated, on the one hand, by the rotatable support of pin 8 and, on the other hand, by the use of two diametrically opposite knives 6 and 7. In the area of floor 3, it is also possible to use more than two knives, preferably spaced equidistantly from each other, offset in circumferential direction. Device 1 can advantageously be rotated automatically, for example, by a drill.

What is claimed is:

1. An apparatus for processing an end of a coaxial high frequency cable, which has a tubular inner conductor, a dielectric enclosing the same, a tubular outer conductor arranged over the same concentrically to the inner conductor, and a sheath of insulation material enclosing the outer conductor, said apparatus including a pot-like device (1) with a cylindrical hollow space (2) in which:

a diameter (D1) of the hollow space (2) of an input area located at an open end of the device (1) corresponds to a diameter of the high frequency cable including its sheath (12), said device (1) includes at least one sheath knife (5) at the end of the input area for cutting the sheath (12), the blade of said knife projecting into the hollow space (2), another diameter (D2) of the hollow space (2) behind the input area corresponds to an outside diameter of the outer conductor (13) of the high frequency cable, said device (1) includes at least one further knife (6,7) at a closed end of said device (1) having a blade for cutting the outer conductor (13), the dielectric, and the inner conductor of the high frequency cable which projects into said hollow space (2), and said device includes a cylindrical pin (8) in the center within said hollow space (2), extending in its axial direction, the outside diameter of the pin corresponding to the inside diameter of the hollow inner conductor (14) of the high frequency cable.

2. An apparatus as claimed in claim 1, wherein the pin (8) protrudes from the device (1).

3. An apparatus as claimed in claim 1, wherein the pin (8) is rotatably supported in the device (1).

4. An apparatus as claimed in claim 1, wherein a wall of the device (1) is perforated up to the hollow space (2) within the area of said closed end at least at a point (11).

5. An apparatus as claimed in claim 1, wherein at the closed end of the device (1) two diametrically opposite knives (6, 7) are mounted.

6. An apparatus as claimed in claim 1, wherein the input area is axially short compared to the axial length of the device (1).

7. An apparatus as claimed in claim 1, wherein an outwardly protruding bolt (10) is attached to the device (1) along its axis.

* * * * *